(12) United States Patent
Peat et al.

(10) Patent No.: US 10,815,645 B2
(45) Date of Patent: Oct. 27, 2020

(54) MOTOR GRADER PROTECTION OF WIRE HARNESSES

(71) Applicant: Deere & Company, Moline, IL (US)

(72) Inventors: Michael D. Peat, Dubuque, IA (US);
Lance R. Sherlock, Asbury, IA (US);
David A. Veasy, Dubuque, IA (US);
Angel N. Villalobos, Rhome, TX (US);
Craig Christofferson, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 95 days.

(21) Appl. No.: 16/165,273

(22) Filed: Oct. 19, 2018

(65) Prior Publication Data
US 2020/0123734 A1 Apr. 23, 2020

(51) Int. Cl.
E02F 9/20 (2006.01)
B60R 16/02 (2006.01)
E02F 9/24 (2006.01)
E02F 3/76 (2006.01)
H01R 13/633 (2006.01)
(Continued)

(52) U.S. Cl.
CPC .............. *E02F 9/2033* (2013.01); *B60D 1/28* (2013.01); *B60R 16/0215* (2013.01); *E02F 3/764* (2013.01); *E02F 3/841* (2013.01); *E02F 9/24* (2013.01); *F16D 9/08* (2013.01);
(Continued)

(58) Field of Classification Search
CPC . E02F 9/2033; E02F 9/24; E02F 3/764; E02F 3/841; B60D 1/28; F16D 9/08; B62D 12/00; H01R 13/633; B60R 16/0215; B60Q 5/005
See application file for complete search history.

(56) References Cited

U.S. PATENT DOCUMENTS 5,732,789 A * 3/1998 Stephenson ............ B62D 12/00
                                                        180/418
5,908,081 A * 6/1999 Olson .................... B62D 12/00
                                                        180/419
(Continued)

FOREIGN PATENT DOCUMENTS

CN 201295622 Y 8/2009
EP 0663478 A1 7/1995
KR 101500723 B1 7/2009

*Primary Examiner* — Dale W Hilgendorf
(74) *Attorney, Agent, or Firm* — Klintworth & Rozenblat IP LLP

(57) ABSTRACT

A protection system for a wire harness in a motor grader includes a controller and a sensor. The controller has a processor executing stored commands and a datastore with memory architecture containing stored angular orientation values for the circle frame. The sensor is coupled to one or more of the circle frame, the draft frame, and a circle actuator that rotates the circle frame relative to the draft frame. The sensor is configured to detect an angular orientation of the circle frame relative to the draft frame. The controller is configured to: receive input signals from the sensor indicating the angular orientation of the circle frame relative to the draft frame; query the datastore for a maximum angular orientation value of the circle frame; and terminate actuation of the circle actuator when the circle frame is at the maximum angular orientation value.

20 Claims, 6 Drawing Sheets

(51) Int. Cl.
  *E02F 3/84*   (2006.01)
  *F16D 9/08*   (2006.01)
  *B60D 1/28*   (2006.01)
  *B60Q 5/00*   (2006.01)
  *B62D 12/00*  (2006.01)

(52) U.S. Cl.
  CPC ........... *H01R 13/633* (2013.01); *B60Q 5/005* (2013.01); *B62D 12/00* (2013.01)

(56) References Cited

U.S. PATENT DOCUMENTS

| | | | | |
|---|---|---|---|---|
| 7,909,389 | B2* | 3/2011 | Bell et al. | E02F 9/166 |
| | | | | 296/190.08 |
| 9,925,983 | B2* | 3/2018 | Mitchell et al. | E02F 9/2033 |
| 10,246,087 | B2* | 4/2019 | Mitchell et al. | E02F 9/2003 |
| 2002/0151213 | A1* | 10/2002 | Aoki et al. | B60R 16/0215 |
| | | | | 439/502 |
| 2015/0135866 | A1 | 5/2015 | Staade et al. | |

* cited by examiner

MOTOR GRADER PROTECTION OF WIRE HARNESSES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to protection of wire harnesses in motor graders.

BACKGROUND OF THE DISCLOSURE

Work vehicles may have one or more implements for carrying out various work operations. Motor graders, for example, may have a blade for performing ground clearing or smoothing operations of a work site. As motor graders have become more complex, electronics may be required in places where they weren't traditionally located. For instance, electrically wired sensors may be placed in a motor grader between a draft frame and a rotatable circle carrying a blade.

SUMMARY OF THE DISCLOSURE

This disclosure provides a protection system for a wire harness of a motor grader.

In one aspect, the disclosure provides a protection system for a wire harness in a motor grader having a draft frame carrying a rotatable circle frame. The wire harness extends from the draft frame to the circle frame. The protection system includes at least one controller and at least one sensor. The at least one controller has a processor executing stored commands and a datastore with memory architecture containing stored angular orientation values for the circle frame. The at least one sensor is coupled to one or more of the circle frame, the draft frame, and a circle actuator that rotates the circle frame relative to the draft frame. The at least one sensor is configured to detect an angular orientation of the circle frame relative to the draft frame. The at least one controller is configured to: receive input signals from the at least one sensor indicating the angular orientation of the circle frame relative to the draft frame; query the datastore for a maximum angular orientation value of the circle frame; and terminate actuation of the circle actuator when the circle frame is at the maximum angular orientation value.

In another aspect, the disclosure provides a method of protecting a wire harness extending from a draft frame to a rotatable circle frame in a motor grader. One step comprises sensing, by at least one controller receiving input signals from at least one sensor, an angular orientation of the circle frame relative to the draft frame. Another step comprises comparing, by the at least one controller, a maximum angular orientation value of the circle frame to the sensed angular orientation of the circle frame. An additional step comprises terminating, by the at least one controller, rotation of the circle frame when the circle frame is at the maximum angular orientation value.

In still another aspect, the disclosure provides a protection system for a wire harness in a motor grader having a draft frame carrying a rotatable circle frame. The wire harness extends from the draft frame to the circle frame. The protection system includes at least one controller and at least one sensor. The at least one controller has a processor executing stored commands and a datastore with memory architecture containing stored angular orientation values for the circle frame. The at least one sensor is coupled to one or more of the circle frame, the draft frame, and a circle actuator that rotates the circle frame relative to the draft frame. The at least one sensor is configured to detect an angular orientation of the circle frame relative to the draft frame. The at least one controller is configured to: receive input signals indicating a connection status of the wire harness; receive input signals from the at least one sensor indicating the angular orientation of the circle frame relative to the draft frame; query the datastore for a maximum angular orientation value of the circle frame; and terminate actuation of the circle actuator when the circle frame is at the maximum angular orientation value and the connection status indicates the wire harness is connected.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
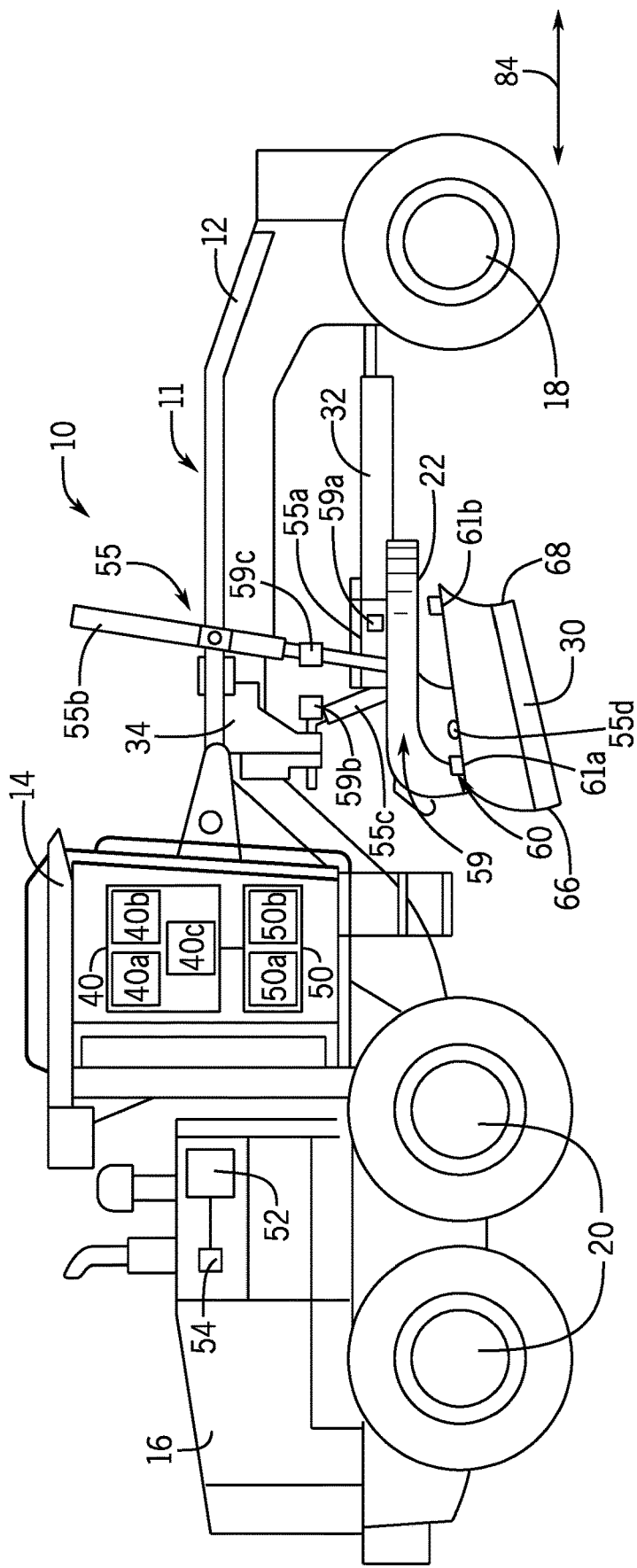
FIG. 1 is a side view of one example embodiment of a work vehicle in the form of a motor grader.

The following describes one or more example embodiments of a protection system for a wire harness in a motor grader having a draft frame carrying a rotatable circle frame with the wire harness extending from the draft frame to the circle frame. Embodiments of the present disclosure are shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Motor graders are large platform machines that have a central blade or moldboard implement mounted to a circle arrangement that rotates and pivots relative to the machine frame or chassis. Often a draft frame is pivotally mounted to the chassis which in turn mounts the circle which rotates relative to the draft frame. Pivoting the draft frame pivots (in the lateral direction transverse to the machine) the blade, and rotation of the circle rotates the blade about an upright (e.g., vertical or obliquely angled up-down axis). The draft frame and circle may also be lifted and lower in the vertical direction. The blade itself is mounted to the circle to be tilted fore and aft to change pitch and to translate laterally. Lateral (left, right) ends of the blade can be at the same height or vary in height to provide a cross-slope variation. Suitable hydraulic pumps, plumbing lines, manifolds, valves, motors and cylinders-piston arrangements are used to move these components by operator input from a cabin of the motor grader. Control architecture onboard the machine may automate movement of these components. Sensors coupled to various locations on or near one or more of the draft frame, the circle and the blade provide position feedback to the one or more controllers as well as an operator notification system (e.g., display, warning lights, or audio features) in the cabin. These sensors are coupled by various wires and cables to bus architecture for the one or more controllers.

In certain motor graders, if an operator rotates the circle past a certain rotational limit, the wires and cabling may be overextended and severed or otherwise damaged. Damage to the wire harness can render certain control features of the machine inoperable, causing downtime and a reduced productivity. As disclosed herein, this can be avoided by a protection system that monitors the circle position relative to the draft frame and the connection status of the wire harness.

In certain embodiments, the protection system may sense an angular orientation of the circle relative to the draft frame, determine the connection status of the wire harness, and implement varied control commands depending on whether the wire harness is connected or disconnected.

In certain embodiments, the protection system may determine the connection status of the wire harness using a device associated with an intermediate connection terminal in-line with the wire harness. The intermediate connection terminal may be a breakaway connector. The device may be a terminal cap or a second connector. The intermediate connection terminal or device may signal the protection system when the intermediate connection terminal is disconnected to indicate that the wire harness is disconnected.

In certain embodiments, if the protection system determines that the wire harness is connected the protection system may implement a first set of commands to compare a threshold angular orientation value of the circle and a maximum angular orientation value of the circle to the sensed angular orientation of the circle. The protection system may slow rotation of the circle when the circle is at the threshold angular orientation value unless the circle is rotated in an opposite direction or the wire harness is manually or automatically disconnected. The protection system may provide an operator notification signal to a display or audio device to alert the operator of this occurrence. The protection system may further terminate rotation of the circle when the circle is at the maximum angular orientation value unless the circle is rotated in the opposite direction or the wire harness is manually or automatically disconnected. The protection system may provide another operator notification signal to the display or audio device to alert the operator of this occurrence.

In certain embodiments, the protection system may require manual disconnection of the wire harness when the circle is at the maximum angular orientation value before proceeding past the maximum rotation angle, while permitting the operator to rotate the circle in the opposite direction. Once the operator manually disconnects the wire harness, the protection system may allow the circle to be rotated past the maximum angular orientation value.

In certain embodiments, the protection system may allow the rotation of the circle past the maximum rotation angle allowing the intermediate disconnect device to disconnect the wire harness without operator intervention. Once the wire harness is disconnected, the protection system may automatically allow the circle to be rotated past the maximum angular orientation value.

In certain embodiments, if the protection system determines that the wire harness is disconnected, the protection system may implement the second set of commands to allow the circle to rotate past the threshold angular orientation value of the circle without slowing down and/or past the maximum angular orientation value of the circle. The protection system may provide an operator notification signal to the display or audio device to alert the operator of this occurrence.

FIG. 1 illustrates one embodiment of a work vehicle 10 comprising a motor grader 11. It will be appreciated that the motor grader 11 may vary from the one illustrated without departing from the scope of the present disclosure.

The motor grader 11 may include a chassis or main frame 12 supporting an operator cabin 14 and a power plant 16 (e.g., a diesel engine, an electric motor, etc.) operably coupled to power a drivetrain. The main frame 12 may be supported off the ground by ground-engaging steered wheels 18 at the front of the machine and by two pairs of tandem drive wheels 20 at the rear of the machine. The power plant 16 may power a hydraulic circuit described in more detail below. In the illustrated example, the main frame 12 may have an articulation joint (not shown) between the operator cabin 14 and power plant 16 that allows the front section of the main frame 12 to deviate from the centerline of the rear section of the main frame 12, such as during a turning operation, to shorten the effective wheelbase, and thus the turning radius, of the motor grader 11. The articulation joint may be pivoted by one or more associated hydraulic actuators (not shown).

A blade 30 may be attached to a circle frame 22. The blade 30 may be configured to move relative to the circle frame 22. The circle frame 22, and the attached blade 30, may be moveably mounted to the main frame 12 in front of the operator cabin 14 by a draft frame 32 and a lifter bracket 34. The circle frame 22 may be moved relative to the draft frame 32 and the main frame 12 into different orientations to control the position of the blade 30. The power plant 16 may power one or more hydraulic pumps 52, which pressurize hydraulic fluid in a hydraulic circuit including various electro-hydraulic control valves 54, and various hydraulic actuators 55 for the blade 30.

In the illustrated example, the various actuators 55 may be configured as rotating drives and linear actuators, such as one or more hydraulic cylinders. The actuators 55 may include a rotating hydraulic drive (also referred to as a circle actuator) 55a for rotating the circle frame 22 about a generally vertical axis to set the steer angle of the blade 30. The actuators 55 may also include lift cylinders 55b for raising and lowering the circle frame 22 and blade 30 and setting the toe-to-heel slope of the blade 30, a shift cylinder 55c for shifting the blade 30 laterally, and a pitch cylinder 55d for setting the pitch angle of the blade 30. In other configurations, other movements of the circle frame 22 and blade 30 may be possible. Further, in some embodiments, a different number or configuration of hydraulic cylinders or other actuators (e.g., pneumatic actuators, electric motors, etc.) may be used. Thus, it will be understood that the configuration of the motor grader 11, the draft frame 32, the circle frame 22, and the blade 30 are presented as an example only.

As noted, the motor grader 11 may include one or more pumps 52, which may be driven by the engine of the motor grader 11. Flow from the pumps 52 may be routed through the various control valves 54 via various conduits (e.g., flexible hoses) in order to drive the hydraulic drives and cylinders 55a-55d. Flow from the pumps 52 may also power various other components of the motor grader 11. The flow from the pumps 52 may be controlled in various ways (e.g., through control of the various control valves 54) in order to cause movement of the hydraulic drives and cylinders 55a-55d thereby causing movement of the blade 30 relative to the circle frame 22, draft frame 32, and main frame 12, and/or controlling movement of the circle frame 22 and attached blade 30 relative to the draft frame 32 and main frame 12. In this way, for example, movement of the blade 30 into various orientations may be implemented by various control signals to the pumps 52 and the control valves 54.

The operator cabin 14 may provide an enclosure for an operator seat and an operator console for mounting various control devices (e.g., steering wheel, accelerator and brake pedals), communication equipment and other instruments used in the operation of the motor grader 11, including an operator interface 40 providing graphical (or other) input controls and output/feedback. The operator interface 40 may be configured in a variety of ways. In some embodiments, the operator interface 40 may include one or more joysticks, various switches or levers, one or more buttons, a touch-screen interface that may be overlaid on a display, a keyboard, a speaker, a microphone associated with a speech recognition system, or various other human-machine interface devices.

The operator interface 40 may be operatively connected to one or more controllers, such as the at least one controller 50. The operator interface 40 may comprise one or more input devices 40a, one or more displays 40b, one or more audio devices 40c, or other types of devices. The one or more input devices 40a of the operator interface 40 may allow the operator to provide control inputs to the at least one controller 50, which cooperates to control various ones of the associated electro-hydraulic control valves 54 to actuate the various drives and actuators 55a-55d of the hydraulic circuit. The at least one controller 50 may receive operator inputs from the operator interface 40 for various parameters of the machine, implement(s) or other subsystems. Further, the operator interface 40 may act as an intermediary between other operator controls and the at least one controller 50 to set, or allow the operator to set or select, the mapping or functionality of one or more of controls (e.g., switches or joystick movements) of the operator controls. The one or more displays 40b and the one or more audio devices 40c may provide outputs to the operator such as warnings, messages, or other information pertinent to operation of the motor grader 11.

The at least one controller 50 may be configured as a computing device with at least one processor device 50a and at least one datastore 50b comprising a data memory architecture comprising stored data and processing code containing instructions for implementation by the at least one processor device 50a, as a hard-wired computing circuit (or circuits), as a programmable circuit, as a hydraulic, electrical or electro-hydraulic controller, or otherwise. The datastore 50b may store data such as one or more stored angular orientation value of the circle frame 22, one or more threshold angular orientation value of the circle frame 22, one or more maximum orientation value of the circle frame 22, or other data. As such, the at least one controller 50 may be configured to execute various computational and control functionality with respect to the motor grader 11 (or other machinery). In some embodiments, the at least one controller 50 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the at least one controller 50 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The at least one controller 50 may send control signals to the actuators 55 for changing and controlling the orientation of the blade 30 relative to the circle frame 22, draft frame 32, and main frame 12, and/or to change and control the orientation of the blade 30 and circle frame 22 relative to the draft frame 32 and main frame 12. It will be appreciated that the at least one controller 50 may also send control signals to the power plant 16, an accelerator, a braking system, and the like for changing the velocity of the motor grader 11. Moreover, the at least one controller 50 may send control signals to a steering system associated with the steered wheels 18 for changing the steering direction of the motor grader 11.

The at least one controller 50 may be in electronic, hydraulic, mechanical, or other communication with the actuators 55 and/or other systems or devices of the motor grader 11 (or other machinery). For example, the at least one controller 50 may be in electronic or hydraulic communication with various actuators, sensors, and other devices within (or outside of) the motor grader 11, including various devices associated with the pumps 52, control valves 54, and so on. The at least one controller 50 may communicate with other systems or devices of the motor grader 11 in various known ways, including via a Controller Area Network (i.e. CAN bus) of the motor grader 11, via wireless communication, hydraulic communication means, or otherwise. An example location for the at least one controller 50 is depicted in FIG. 1. It will be understood, however, that other locations are possible including other locations on the motor grader 11, or various remote locations.

One or more sensors 59 may also be provided to observe and detect various conditions associated with the blade 30 of the motor grader 11. In some embodiments, various sensors 59 may be disposed on or near the blade 30, or elsewhere on the motor grader 11. For example, the one or more sensors 59 may include a GPS 60 with at least one transceiver unit mounted directly to the blade 30. In the illustrated embodiment, for example, the GPS 60 may include a first GPS transceiver unit 61*a* mounted in a predetermined position relative to a first end 66 of the blade 30. The GPS 60 may also include a second GPS transceiver unit 61*b* mounted in a predetermined position relative to an opposite second end 68 of the blade 30. The transceiver units 61*a*, 61*b* may be connected to the at least one controller 50. Various other sensors 59, such as additional sensors 59*a*-59*c* for the blade 30 may also be disposed on or near the circle frame 22. In some embodiments, the sensors 59*a*-59*c* may include angle sensors to detect rotational angle orientations of the circle frame 22 and/or the blade 30, linear sensors to detect the "length" of an associated cylinder of the circle frame 22 and/or the blade 30, or microelectromechanical sensors (MEMS) that observe a force of gravity and an acceleration associated with the circle frame 22 and/or the blade 30. The or more sensors 59 may be coupled to the circle frame 22, the draft frame 32, the circle actuator 55*a*, the blade 30, and/or to other parts of the motor grader 11.

The various components noted above (or others) may be utilized to control movement of the blade 30 relative to the circle frame 22, draft frame 32, and main frame 12, and/or to control movement of the circle frame 22 and blade 30, relative to the draft frame 32 and main frame 12, via control of the movement of the one or more hydraulic actuators 55. Accordingly, these components may be viewed as forming part of the coordinated control system and method of operation of the motor grader 11. Each of the one or more sensors 59 may be in communication with the at least one controller 50 via a suitable communication architecture.

Additionally, in the illustrated example, the motor grader 11 may have an Integrated Grade Control (IGC) system, which is a high-precision blade control system using GPS and stored terrain map data. In some embodiments, the IGC system may also allow for operator control of an initial orientation setting, such as an initial height setting for the blade 30, and for a combination of operator and automated position control. In additional embodiments, the IGC system may allow for fully-automated orientation control. In either case, the height and cross-slope (i.e., the heel-toe lateral orientation) of the blade 30 may be precisely controlled to provide the prescribed grade in the work site.

In various embodiments, the at least one controller 50 may output one or more control signals or control commands to one or more of the actuators 55*a*, 55*b*, 55*c*, 55*d* associated with the circle frame 22 and/or attached blade 30 based on one or more of the sensor signals received from the one or more sensors 59 and/or input received from the operator interface 40. The at least one controller 50 may output the one or more control signals or control commands to the pumps 52 and/or control valves 54 associated with the actuators 55*a*-55*d* based on one or more of the sensor signals received from the one or more sensors 59 and input received from the operator interface 40 in order to control movement of the blade 30 and/or circle frame 22.

Figure 2:
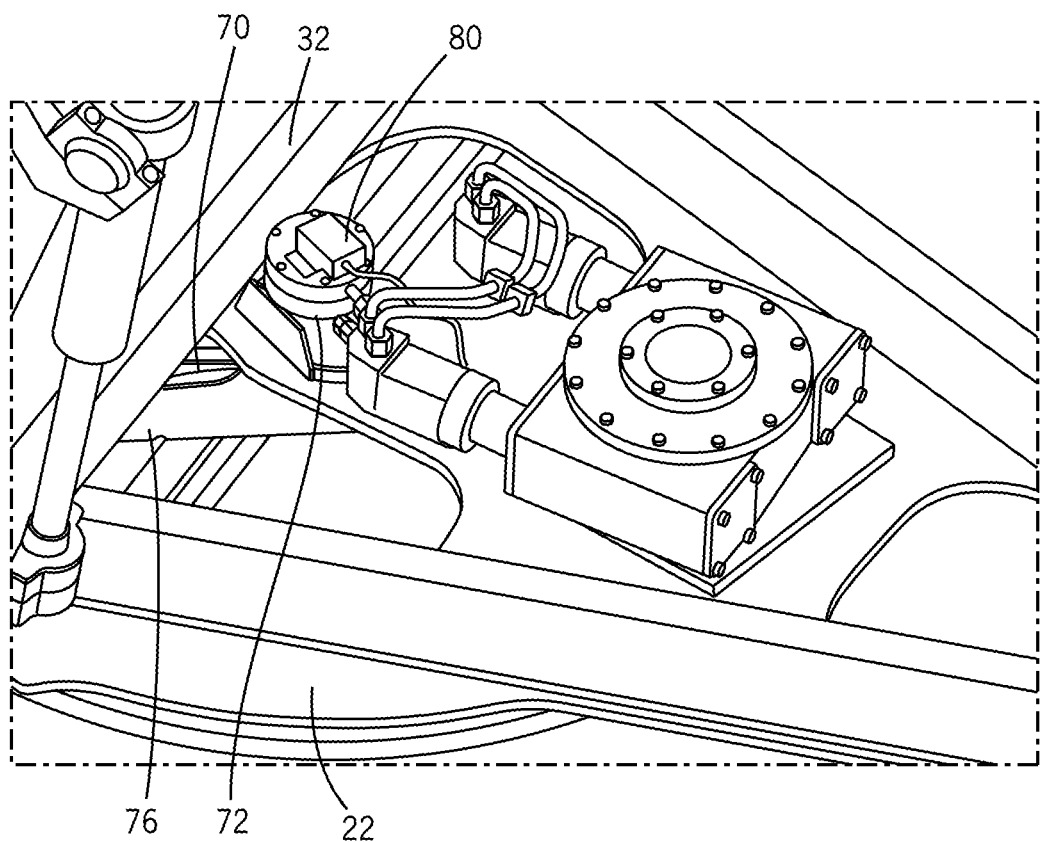
FIG. 2 is a partial top perspective view showing parts of a draft frame, a circle frame, and a wire harness of the example motor grader of FIG. 1.
Figure 3:
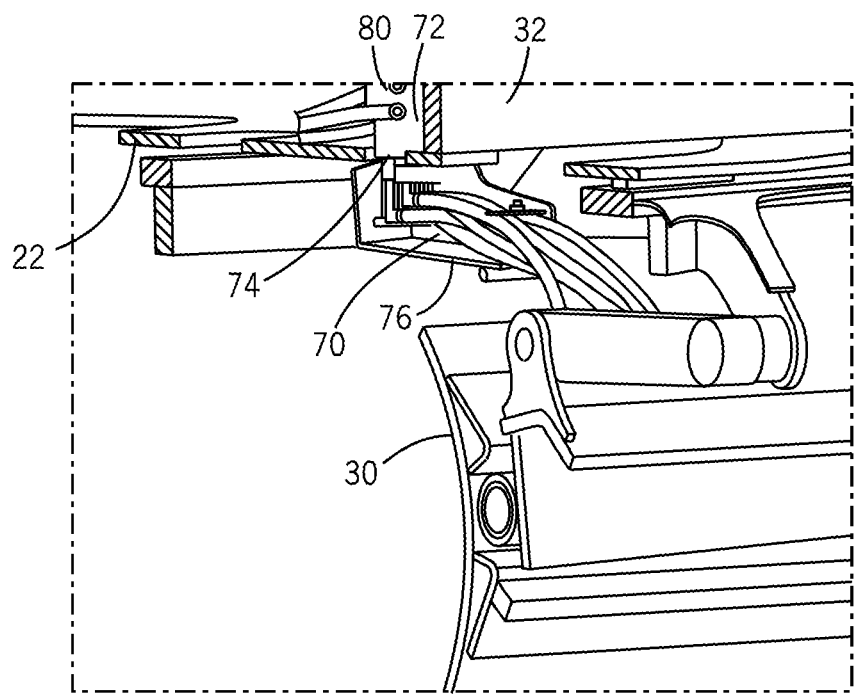
FIG. 3 is a partial rear perspective view of the draft frame, circle frame, and wire harness of FIG. 2.
Figure 4:
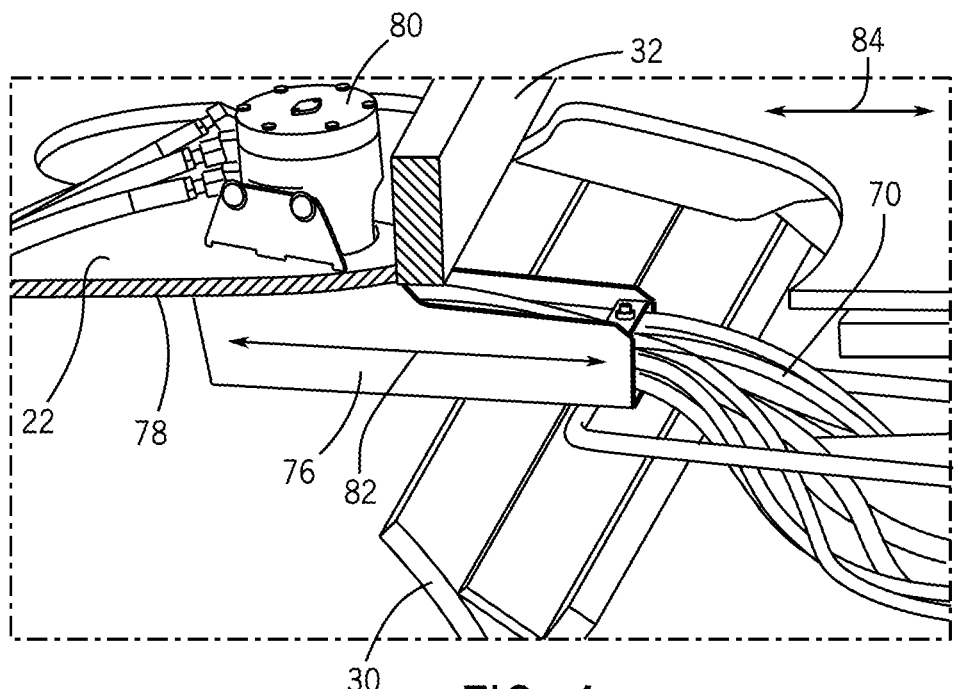
FIG. 4 is a partial side perspective view of the draft frame, circle frame, and wire harness of FIG. 2.

FIGS. 2-4 collectively illustrate various views of one embodiment of a wire harness 70 extending from the draft frame 32 to the circle frame 22. The wire harness 70 of FIGS. 2-4 may be utilized in the embodiment of FIG. 1. The wire harness 70 comprises wiring which may electrically connect the one or more sensors 59 (shown in FIG. 1) to the at least one controller 50 (shown in FIG. 1). A portion of the wire harness 70 may extend from the at least one controller 50 (shown in FIG. 1), along the draft frame 32, through a hole 72 in the draft frame 32, through a hole 74 in the circle frame 22, along a tray 76 fixedly attached to a bottom 78 of the circle frame 22, to the one or more sensors 59 (shown in FIG. 1) which may be coupled to the circle frame 22, the draft frame 32, the circle actuator 55*a* (shown in FIG. 1), and/or the blade 30. A hydraulic manifold 80 may also extend through the hole 72 in the draft frame 32 through the hole 74 in the circle frame 22. The hydraulic manifold 80 may assist in regulating the fluid flow between the one or more hydraulic pumps 52 (shown in FIG. 1), electro-hydraulic control valves 54 (shown in FIG. 1), and hydraulic actuators 55 (shown in FIG. 1). Referring to FIGS. 1-5 collectively, as the circle frame 22 and/or blade 30 rotate relative to the draft frame 32, the wire harness 70 is less taught when a longitudinal axis 82 of the tray 76 is parallel to a longitudinal axis 84 of the draft frame 32 and becomes progressively more taught as the longitudinal axis 82 of the tray 76 rotates away from being parallel to the longitudinal axis 84 of the draft frame 32 towards being in a perpendicular position with the longitudinal axis 84 of the draft frame 32. During this movement, unless a protection system (discussed below) is implemented, the wire harness 70 may be overextended as it becomes taught and wraps around the draft frame 32, the hydraulic actuators 55, the circle frame 22, the tray 76, the one or more sensors 59, or another portion of the motor grader 11 which may cause the wire harness 70 to be partially or wholly severed.

Figure 5:
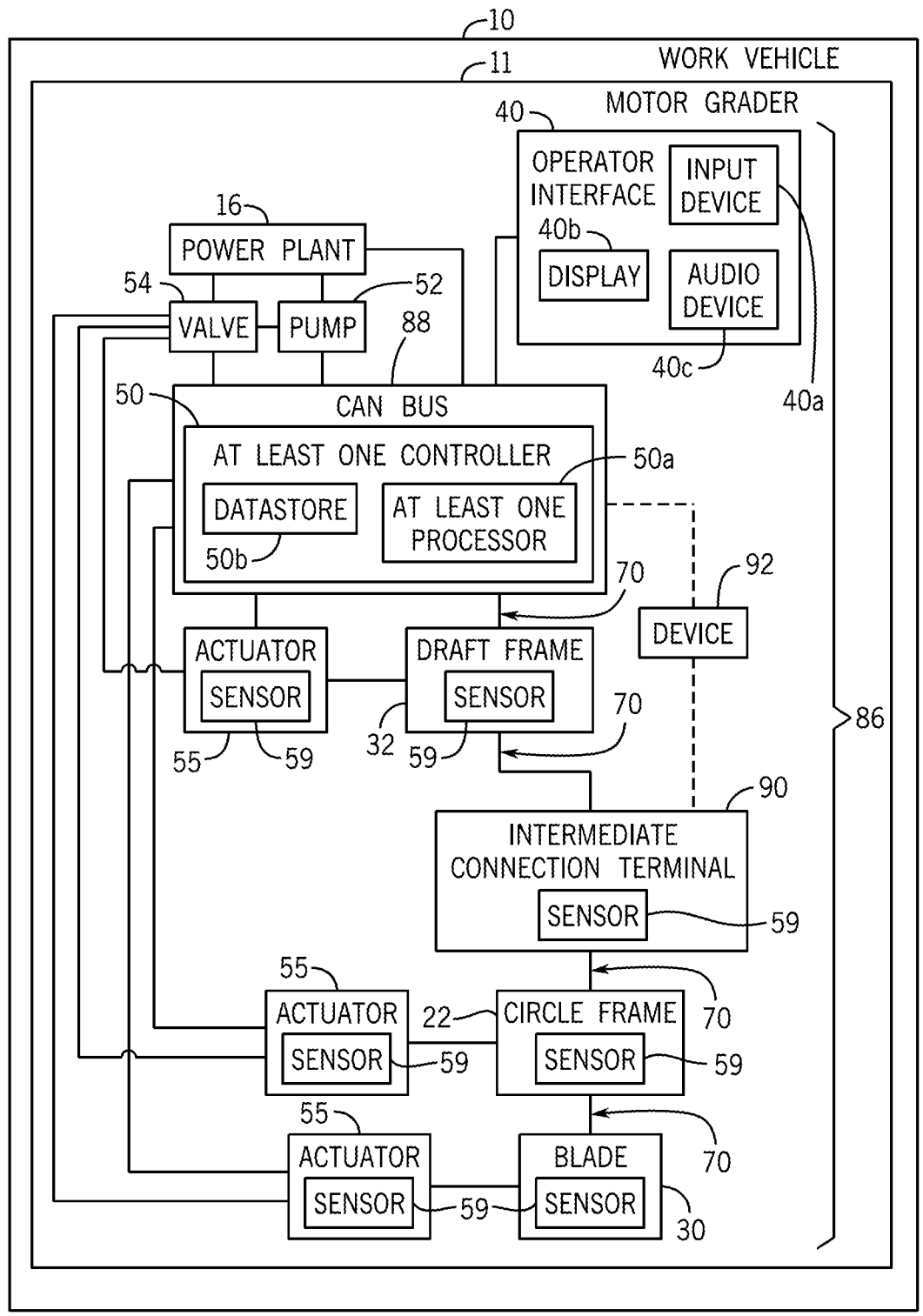
FIG. 5 is a schematic diagram of the example motor grader of FIG. 1.

FIG. 5 illustrates a schematic diagram of a portion of one embodiment of a work vehicle 10. The numbered components of FIG. 5 may have the same function as the corresponding numbered components of the embodiment of FIGS. 1-4. The work vehicle 10 may comprise a motor grader 11. The motor grader 11 may comprise a power plant 16, circle frame 22, blade 30, draft frame 32, operator interface 40, at least one controller 50, pump 52, valve 54, actuators 55, sensors 59, wire harness 70, protection system 86, CAN bus 88, intermediate connection terminal 90, and device 92.

The at least one controller 50 may communicate with, over, and/or control the following components: the power plant 16; the operator interface 40; the pump 52; the valve 54; the actuators 55; the sensors 59; the wire harness 70; the protection system 86; the intermediate connection terminal 90; and the device 92. The at least one controller 50 may communicate with nodes of these components over the CAN bus 88 which is a standardized signal communication channel for inputs to the at least one controller 50. Each of the nodes of these components may have their individual address at which the components are connected and interface with the at least one controller 50. The at least one controller 50 may receive a signal from each of these components indicating, based on the individual address, whether the particular component is connected or disconnected from the CAN bus network. The at least one controller 50 may be configured as a computing device with at least one processor device 50*a* and at least one datastore 50*b* comprising a data memory architecture comprising stored data and processing code containing instructions for implementation by the at least one processor device 50a, as a hard-wired computing circuit (or circuits), as a programmable circuit, as a hydraulic, electrical or electro-hydraulic controller, or otherwise. The datastore 50b may store data such as one or more stored angular orientation value of the circle frame 22, one or more threshold angular orientation value of the circle frame 22, one or more maximum orientation value of the circle frame 22, or other data.

The operator interface 40 may comprise one or more input devices 40a, one or more displays 40b, one or more audio devices 40c, or other types of devices. The one or more input devices 40a of the operator interface 40 may allow the operator to provide control inputs to the at least one controller 50, which cooperates to control various ones of the associated electro-hydraulic control valves 54 to actuate the various drives and actuators 55a-55d of the hydraulic circuit. The at least one controller 50 may receive operator inputs from the operator interface 40 for various parameters of the machine, implement(s) or other sub-systems. Further, the operator interface 40 may act as an intermediary between other operator controls and the at least one controller 50 to set, or allow the operator to set or select, the mapping or functionality of one or more of controls (e.g., switches or joystick movements) of the operator controls. The one or more displays 40b and the one or more audio devices 40c may provide outputs to the operator such as warnings, messages, or other information pertinent to operation of the motor grader 11.

The power plant 16 may power the pump 52 and valve 54 to provide hydraulic pressure, as controlled by the at least one controller 50, to move the draft frame 32, the circle frame 22, and the blade 30 relative to one another. The protection system 86 may comprise the operator interface 40, the at least one controller 50, sensors 59, wire harness 70, intermediate connection terminal 90, and device 92. The protection system 86 may communicate over the CAN bus 88. The protection system 86 may, as controlled by the at least one controller 50, follow the method 94 provided in FIG. 6 to protect the wire harness 70 during movement of the circle frame 22 and/or blade 30 relative to the draft frame 32.

Figure 6:
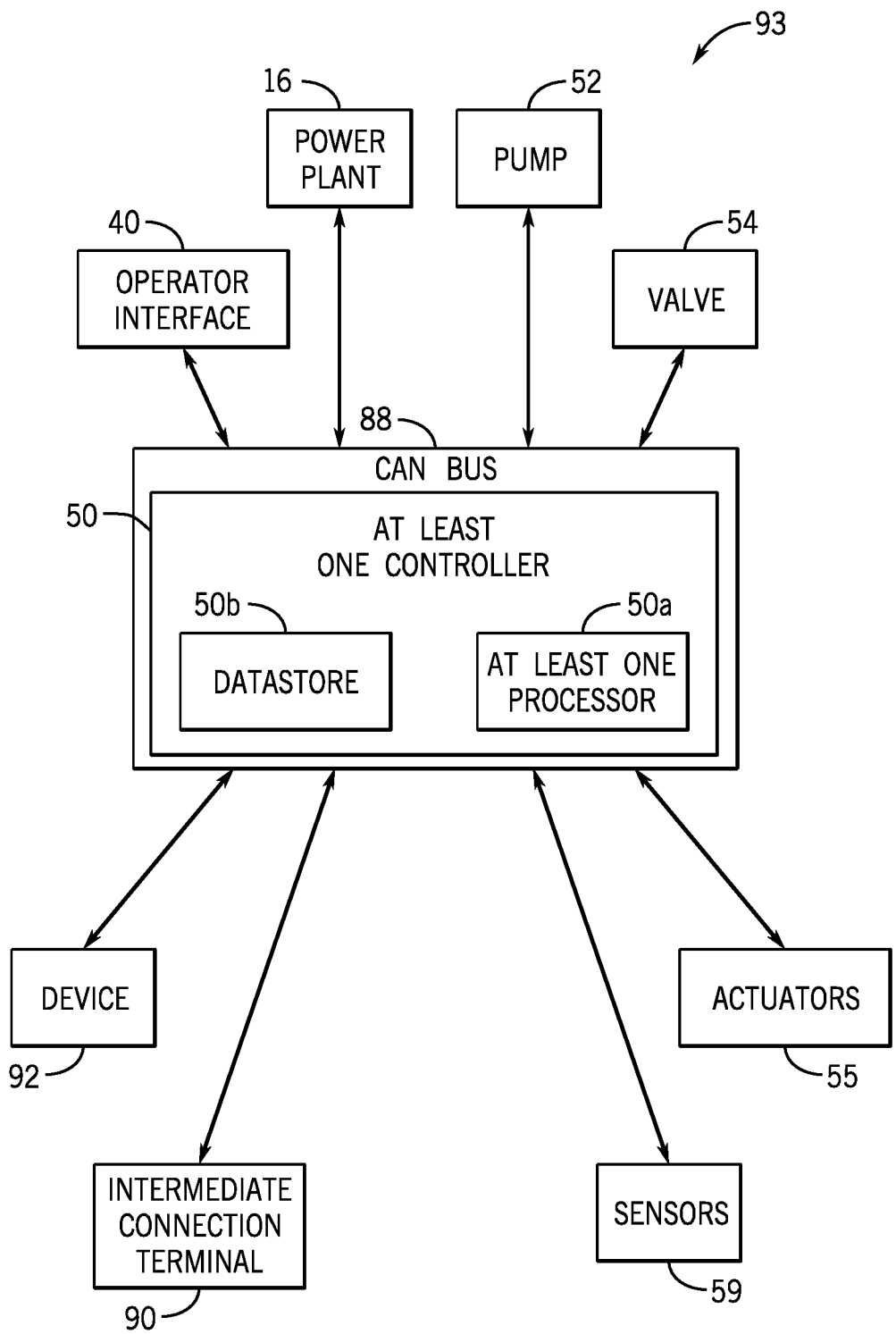
FIG. 6 is a schematic diagram of one example embodiment of a control system for the example motor grader of FIG. 1.

FIG. 6 illustrates one embodiment of a control system 93 of the work vehicle 10 of FIGS. 1 and 5. The numbered components of FIG. 6 may have the same function as the corresponding numbered components of the embodiment of FIGS. 1-5. The control system 93 may comprise the at least one controller 50 in two-way communication with the power plant 16, operator interface 40, pump 52, valve 54, actuators 55, sensors 59, intermediate connection terminal 90, and device 92. Communications may take place over the CAN bus 88 as previously described with respect to FIG. 5. The at least one controller 50 may receive input signals from each of the power plant 16, operator interface 40, pump 52, valve 54, actuators 55, sensors 59, intermediate connection terminal 90, and device 92. The at least one controller 50 may process the received input signals and, based on the processing, output control signals to each of the power plant 16, operator interface 40, pump 52, valve 54, actuators 55, sensors 59, intermediate connection terminal 90, and device 92 in order to control each of these components. In other embodiments, one or more components of the control system 93 may vary.

Figure 7:
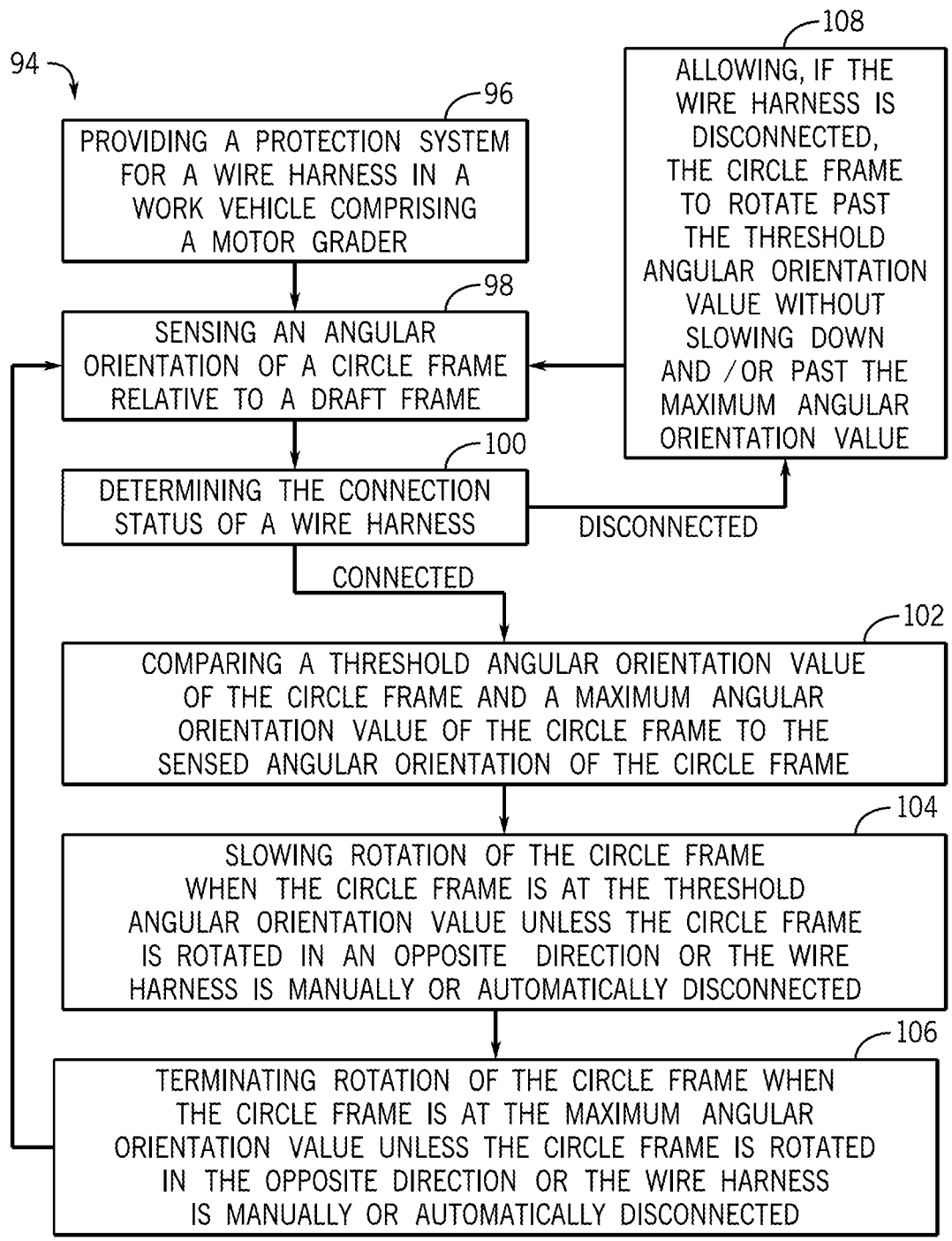
FIG. 7 is a process diagram of one example method of protecting a wire harness of the example motor grader of FIG. 1.

FIG. 7 illustrates one embodiment of a method 94 which may be saved as stored commands in programming code in the datastore 50b of the at least one controller of FIGS. 1 and 5-6 and implemented by the at least one processor 50a of the at least one controller 50 of the control system 93 of FIG. 6. The method 94 may utilize any of the work vehicle/protection systems embodiments disclosed herein. As illustrated collectively in FIGS. 1 and 5-7, step 96 may comprise providing a protection system 86 for a wire harness 70 in a work vehicle 10 comprising a motor grader 11. The motor grader 11 may comprise a draft frame 32 carrying a rotatable circle frame 22. The wire harness 70 may extend from the draft frame 32 to the circle frame 22. The protection system 86 may include: at least one controller 50 having at least one processor 50a executing stored commands, and a datastore 50b with memory architecture containing stored angular orientation values for the circle frame 22, one or more threshold angular orientation value for the circle frame 22, and one or more maximum angular orientation value for the circle frame 22; and at least one sensor 59 coupled to one or more of the circle frame 22, the draft frame 32, and a circle actuator 55a that rotates the circle frame 22 relative to the draft frame 32. The one or more threshold angular value of the circle frame 22 may be less than the one or more maximum angular orientation value for the circle frame 22. The at least one sensor 59 may be configured to detect the angular orientation of the circle frame 22 relative to the draft frame 32 and store it in the datastore 50b for processing by the at least one processor 50a. In other embodiments, the provided work vehicle 10, including its protection system 86, may vary in type, configuration, components, or structure. The method 94 may proceed from step 96 to step 98.

Step 98 may comprise sensing, by the at least one controller 50 receiving input signals from the at least one sensor 59, an angular orientation of the circle frame 22 relative to the draft frame 32. The method 94 may proceed from step 98 to step 100.

Step 100 may comprise determining, by the at least one controller 50, the connection status of the wire harness 70. In one embodiment, this determination may be made, as previously described, using one or more of the CAN bus 88 to which the wire harness 70 is connected and a device 92 associated with an intermediate connection terminal 90 in-line with the wire harness 70. In one embodiment, the intermediate connection terminal 90 may comprise a breakaway connector and the device 92 may comprise a terminal cap or a second connector, and the intermediate connection terminal 90 or device 92 may signal the at least one controller 50 when the intermediate connection terminal 90 is disconnected to indicate that the wire harness 70 is disconnected.

If step 100 determines that the wire harness 70 is connected, the method 94 may proceed from step 100 to step 102. Step 102 may comprise implementing a first set of commands to compare, by the at least one controller 50, the threshold angular orientation value of the circle frame 22 and the maximum angular orientation value of the circle frame 22 to the sensed angular orientation of the circle frame 22. The method 94 may proceed from step 102 to step 104.

Step 104 may comprise slowing, by the at least one controller 50, rotation of the circle frame 22 when the circle frame 22 is at the threshold angular orientation value unless the circle frame 22 is rotated in an opposite direction or the wire harness 70 is manually or automatically disconnected. In one embodiment, step 104 may further comprise the operator manually disconnecting the wire harness 70 and the at least one controller 50 then allowing the circle frame 22 to be rotated past the threshold angular orientation value without slowing down, and/or the operator or the at least one controller 50 causing the circle frame 22 to rotate in the opposite direction away from the threshold angular orientation value to avoid the slow-down process. Step 104 may further comprise, if the wire harness 70 is connected and the circle frame 22 is at the threshold angular orientation value, reducing pressure to the actuator 55 and/or providing an operator notification signal to a display 40b or audio device 40c to alert the operator of the occurrence such as by issuing a warning. The method 94 may proceed from step 104 to step 106.

Step 106 may comprise terminating, by the at least one controller 50, rotation of the circle frame 22 when the circle frame 22 is at the maximum angular orientation value unless the circle frame 22 is rotated in the opposite direction or the wire harness 70 is manually or automatically disconnected. In one embodiment, step 106 may further comprise the operator manually disconnecting the wire harness 70 and the at least one controller 50 then allowing the circle frame 22 to be rotated past the maximum angular angular orientation value, the at least one controller 50 causing the wire harness 70 to automatically disconnect and then the at least one controller 50 allowing the circle frame 22 to be rotated past the maximum angular orientation value, and/or the operator or the at least one controller 50 causing the circle frame 22 to rotate in the opposite direction to avoid rotation termination. Step 106 may further comprise, if the wire harness 70 is connected and the circle frame 22 is at the maximum angular orientation value, reducing pressure to the actuator 55 and/or providing an operator notification signal to the display 40b or audio device 40c to alert the operator of the occurrence such as by issuing a warning. The method 94 may proceed from step 106 to step 98 and repeat the steps of the method 94.

If step 100 determines that the wire harness 70 is disconnected, the method 94 may proceed from step 100 to step 108. Step 108 may comprise, if the wire harness 70 is disconnected, implementing a second set of commands to allow, by the at least one controller 50, the circle frame 22 to rotate past the threshold angular orientation value of the circle frame 22 without slowing down and/or past the maximum angular orientation value of the circle frame 22. Step 100 may further comprise, if the wire harness 70 is disconnected, providing an operator notification signal to the display 40b or audio device 40c alerting the operator of the occurrence such as by indicating the disconnected status of the wire harness 70. The method 94 may proceed from step 100 to step 98 and repeated the steps of the method 94.

In other embodiments of the method 94, one or more of the steps may vary in substance or in order, one or more additional steps may be added, or one or more steps may not be followed.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

Also, the following examples are provided, which are numbered for easier reference.

1. A protection system for a wire harness in a motor grader having a draft frame carrying a rotatable circle frame, the wire harness extending from the draft frame to the circle frame, the protection system including: at least one controller having a processor executing stored commands and a datastore with memory architecture containing stored angular orientation values for the circle frame; and at least one sensor coupled to one or more of the circle frame, the draft frame, and a circle actuator that rotates the circle frame relative to the draft frame, the at least one sensor being configured to detect an angular orientation of the circle frame relative to the draft frame; wherein the at least one controller is configured to: receive input signals from the at least one sensor indicating the angular orientation of the circle frame relative to the draft frame; query the datastore for a maximum angular orientation value of the circle frame; and terminate actuation of the circle actuator when the circle frame is at the maximum angular orientation value.

2. The protection system of example 1, wherein the datastore contains a threshold angular orientation value that is less than the maximum angular orientation value; and wherein the at least one controller is configured to slow actuation of the circle actuator upon receiving input signals from the at least one sensor indicating the angular orientation of the circle frame is at the threshold angular orientation value.

3. The protection system of example 1, wherein the at least one controller is configured to receive input signals of a connection status of the wire harness from one or more of a CAN bus to which the wire harness is connected and a device associated with an intermediate connection terminal in-line with the wire harness.

4. The protection system of example 3, wherein the intermediate connection terminal is a breakaway connector and the device providing the input signals of the connection status is a terminal cap.

5. The protection system of example 4, wherein the breakaway connector signals the at least one controller when disconnected.

6. The protection system of example 5, wherein the datastore contains a threshold angular orientation value that is less than the maximum angular orientation value; and wherein the at least one controller is configured to slow actuation of the circle actuator upon receiving input signals from the at least one sensor indicating the angular orientation of the circle frame is at the threshold angular orientation value.

7. The protection system of example 6, wherein the at least one controller is configured to output an operator notification signal to a display or audio device.

8. A method of protecting a wire harness extending from a draft frame to a rotatable circle frame in a motor grader, the method including: sensing, by at least one controller receiving input signals from at least one sensor, an angular orientation of the circle frame relative to the draft frame; comparing, by the at least one controller, a maximum angular orientation value of the circle frame to the sensed angular orientation of the circle frame; and terminating, by the at least one controller, rotation of the circle frame when the circle frame is at the maximum angular orientation value.

9. The method of example 8, further including: actuating, by the at least one controller, a hydraulic actuator at a reduced pressure upon receiving input signals from the at least one sensor indicating the angular orientation of the circle frame is at a threshold angular orientation value.

10. The method of example 8, further including: receiving, by the at least one controller, input signals of a connection status of the wire harness from one or more of a CAN bus to which the wire harness is connected and a device associated with an intermediate connection terminal in-line with the wire harness.

11. The method of example 10, further including: outputting, by the at least one controller, an operator notification signal to a display or audio device indicating the connection status of the wire harness.

12. A protection system for a wire harness in a motor grader having a draft frame carrying a rotatable circle frame, the wire harness extending from the draft frame to the circle frame, the protection system including: at least one controller having a processor executing stored commands and a datastore with memory architecture containing stored angular orientation values for the circle frame; and at least one sensor coupled to one or more of the circle frame, the draft frame, and a circle actuator that rotates the circle frame relative to the draft frame, the at least one sensor being configured to detect an angular orientation of the circle frame relative to the draft frame; wherein the at least one controller is configured to: receive input signals indicating a connection status of the wire harness; receive input signals from the at least one sensor indicating the angular orientation of the circle frame relative to the draft frame; query the datastore for a maximum angular orientation value of the circle frame; and terminate actuation of the circle actuator when the circle frame is at the maximum angular orientation value and the connection status indicates the wire harness is connected.

13. The protection system of example 12, wherein the datastore contains a threshold angular orientation value that is less than the maximum angular orientation value; and wherein the at least one controller is configured to slow actuation of the circle actuator upon receiving input signals from the at least one sensor indicating the angular orientation of the circle frame is at the threshold angular orientation value.

14. The protection system of example 12, wherein the at least one controller is configured to receive the input signals of the connection status from one or more of a CAN bus to which the wire harness is connected and a device associated with an intermediate connection terminal in-line with the wire harness.

15. The protection system of example 14, wherein the intermediate connection terminal is a breakaway connector and the device providing the input signals of the connection status is a terminal cap.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A protection system for a wire harness in a motor grader having a draft frame carrying a rotatable circle frame, the wire harness extending from the draft frame to the circle frame, the protection system comprising:
   at least one controller having a processor executing stored commands and a datastore with memory architecture containing stored angular orientation values for the circle frame; and
   at least one sensor coupled to one or more of: the circle frame, the draft frame, and a circle actuator that rotates the circle frame relative to the draft frame, the at least one sensor being configured to detect an angular orientation of the circle frame relative to the draft frame;
   wherein the at least one controller is configured to:
      receive input signals from the at least one sensor indicating the angular orientation of the circle frame relative to the draft frame;
      query the datastore for a maximum angular orientation value of the circle frame; and
      terminate actuation of the circle actuator when the circle frame is at the maximum angular orientation value.

2. The protection system of claim 1, wherein the datastore contains a threshold angular orientation value that is less than the maximum angular orientation value; and
   wherein the at least one controller is configured to slow actuation of the circle actuator upon receiving input signals from the at least one sensor indicating the angular orientation of the circle frame is at the threshold angular orientation value.

3. The protection system of claim 1, wherein the at least one controller is configured to receive input signals of a connection status of the wire harness from one or more of a Controller Area Network ("CAN") bus to which the wire harness is connected and a terminal cap associated with an intermediate connection terminal in-line with the wire harness.

4. The protection system of claim 3, wherein the intermediate connection terminal is a breakaway connector.

5. The protection system of claim 4, wherein the breakaway connector signals the at least one controller when disconnected.

6. The protection system of claim 5, wherein the datastore contains a threshold angular orientation value that is less than the maximum angular orientation value; and
   wherein the at least one controller is configured to slow actuation of the circle actuator upon receiving input signals from the at least one sensor indicating the angular orientation of the circle frame is at the threshold angular orientation value.

7. The protection system of claim 6, wherein the at least one controller is configured to output an operator notification signal to a display or audio device.

8. A method of protecting a wire harness extending from a draft frame to a rotatable circle frame in a motor grader, the method comprising:
   sensing, by at least one controller receiving input signals from at least one sensor, an angular orientation of the circle frame relative to the draft frame;
   comparing, by the at least one controller, a maximum angular orientation value of the circle frame to the sensed angular orientation of the circle frame; and
   terminating, by the at least one controller, rotation of the circle frame when the circle frame is at the maximum angular orientation value.

9. The method of claim 8, further including:
   actuating, by the at least one controller, a hydraulic actuator at a reduced pressure upon receiving input signals from the at least one sensor indicating the angular orientation of the circle frame is at a threshold angular orientation value.

10. The method of claim 8, further including:
    receiving, by the at least one controller, input signals of a connection status of the wire harness from one or more of a Controller Area Network ("CAN") bus to which the wire harness is connected and a terminal cap associated with an intermediate connection terminal in-line with the wire harness.

11. The method of claim 10, further including:
    outputting, by the at least one controller, an operator notification signal to a display or audio device indicating the connection status of the wire harness.

12. A protection system for a wire harness in a motor grader having a draft frame carrying a rotatable circle frame, the wire harness extending from the draft frame to the circle frame, the protection system comprising:
    at least one controller having a processor executing stored commands and a datastore with memory architecture containing stored angular orientation values for the circle frame; and
    at least one sensor coupled to one or more of: the circle frame, the draft frame, and a circle actuator that rotates the circle frame relative to the draft frame, the at least one sensor being configured to detect an angular orientation of the circle frame relative to the draft frame;
    wherein the at least one controller is configured to:
       receive input signals indicating a connection status of the wire harness;
       receive input signals from the at least one sensor indicating the angular orientation of the circle frame relative to the draft frame;
       query the datastore for a maximum angular orientation value of the circle frame; and
       terminate actuation of the circle actuator when the circle frame is at the maximum angular orientation value and the connection status indicates the wire harness is connected.

13. The protection system of claim 12, wherein the datastore contains a threshold angular orientation value that is less than the maximum angular orientation value; and
    wherein the at least one controller is configured to slow actuation of the circle actuator upon receiving input signals from the at least one sensor indicating the angular orientation of the circle frame is at the threshold angular orientation value.

14. The protection system of claim 12, wherein the at least one controller is configured to receive the input signals of the connection status from one or more of a Controller Area Network ("CAN") bus to which the wire harness is connected and a terminal cap associated with an intermediate connection terminal in-line with the wire harness.

15. The protection system of claim 14, wherein the intermediate connection terminal is a breakaway connector.

16. The protection system of claim 15, wherein the breakaway connector signals the at least one controller when disconnected.

17. The protection system of claim 14, wherein, when the connection status indicates the wire harness is connected, the at least one controller is configured to execute a first set of commands, and, when the connection status indicates the wire harness is disconnected, the at least one controller is configured to execute a second set of commands.

18. The protection system of claim 17, wherein the first set of commands includes slowing actuation of the circle actuator upon receiving input signals from the at least one sensor indicating the angular orientation of the circle frame is at a threshold angular orientation value less than the maximum angular orientation value.

19. The protection system of claim 18, wherein the first set of commands includes outputting an operator notification signal to a display or audio device.

20. The protection system of claim 17, wherein the second set of commands permits the circle frame to rotate past the maximum angular orientation value.

\* \* \* \* \*